(12) United States Patent
Krizan et al.

(10) Patent No.: US 10,938,259 B2
(45) Date of Patent: Mar. 2, 2021

(54) STATOR HAVING BOBBIN-EMBEDDED TOOTH TIPS

(71) Applicant: Ford Global Technologies, LLC, Dearborn, MI (US)

(72) Inventors: Jacob Krizan, Farmington Hills, MI (US); Andrew Kasha, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 246 days.

(21) Appl. No.: 15/948,293

(22) Filed: Apr. 9, 2018

(65) Prior Publication Data
US 2019/0312479 A1    Oct. 10, 2019

(51) Int. Cl.
| | | |
|---|---|---|
| *H02K 3/34* | (2006.01) | |
| *H02K 1/16* | (2006.01) | |
| *H02K 3/12* | (2006.01) | |
| *H02K 15/10* | (2006.01) | |
| *B60K 6/36* | (2007.10) | |
| *B60K 6/26* | (2007.10) | |

(Continued)

(52) U.S. Cl.
CPC ............. *H02K 3/345* (2013.01); *B60K 6/26* (2013.01); *B60K 6/36* (2013.01); *B60L 15/007* (2013.01); *H02K 1/16* (2013.01); *H02K 3/12* (2013.01); *H02K 15/10* (2013.01); *B60L 58/10* (2019.02); *B60L 2210/40* (2013.01); *B60L 2220/50* (2013.01); *H02K 29/03* (2013.01); *H02K 2203/12* (2013.01); *Y10S 903/906* (2013.01); *Y10S 903/915* (2013.01)

(58) Field of Classification Search
CPC .......... H02K 3/34; H02K 3/345; H02K 3/487; H02K 3/493
USPC .......... 310/214, 215, 196, 216.125, 216.126, 310/216.082
See application file for complete search history.

(56) References Cited

U.S. PATENT DOCUMENTS 1,042,408 A * 10/1912 Dearborn ............... H02K 3/487
310/214
5,852,335 A    12/1998 Suzuki et al.
(Continued)

FOREIGN PATENT DOCUMENTS

| EP | 2677633 A1 | 6/2013 | |
|---|---|---|---|
| WO | WO-2017163886 A1 * | 9/2017 | ............. H02K 3/493 |
| WO | WO-2017170557 A1 * | 10/2017 | ............. H02K 3/493 |

OTHER PUBLICATIONS

Machine Translation, Okamoto, WO-2017170557-A1, Oct. 2017. (Year: 2017).*

(Continued)

*Primary Examiner* — Thomas Truong
(74) *Attorney, Agent, or Firm* — David B. Kelley; Brooks Kushman P.C.

(57) ABSTRACT

A stator for a hybrid electric vehicle combines the best features of complete stators and segmented stators. The bobbins of a complete stator are modified to effectively widen the teeth and thereby reduce torque ripple. Each resin bobbin includes cavities on either side of the tooth. The cavities are filled with a magnetically conductive insert. In some embodiments, a single wedge shaped insert is installed on each side of each tooth. In other embodiments, multiple inserts of varying cross sectional area are installed on each side of each tooth.

20 Claims, 5 Drawing Sheets

(51) Int. Cl.
*B60L 15/00* (2006.01)
*H02K 29/03* (2006.01)
*B60L 58/10* (2019.01)

(56) References Cited

U.S. PATENT DOCUMENTS

| | | |
|---|---|---|
| 6,844,653 B2 | 1/2005 | Kolomeitsev et al. |
| 6,856,065 B2 | 2/2005 | Suzuki et al. |
| 2007/0052317 A1* | 3/2007 | Tanaka ................... H02K 3/345 |
| | | 310/215 |
| 2008/0007197 A1* | 1/2008 | Obata ................. H02P 29/0241 |
| | | 318/801 |

OTHER PUBLICATIONS

Machine Translation, Okamoto, WO-2017163886-A1, Sep. 2017. (Year: 2017).*

* cited by examiner

STATOR HAVING BOBBIN-EMBEDDED TOOTH TIPS

TECHNICAL FIELD

This disclosure relates to the field motors for hybrid electric motor vehicles. More particularly, the disclosure relates to a method of manufacturing a stator and the resulting apparatus.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some vehicles employ electric motors used in combination with the internal combustion engine to decrease fuel consumption. For example, an electric motor may be used to recapture energy that would otherwise be converted to heat during braking and then use that energy to reduce the power demand on the internal combustion engine. Also, the motor may supplement the power of the internal combustion engine during acceleration events such that a smaller, more efficient engine may be installed without sacrificing performance.

A common type of traction motor is a permanent magnet synchronous motor. An inverter commands variable voltages across stator windings to create a variable magnetic field. The magnetic field is guided by magnetically conductive material in the stator and in the rotor. This magnetic field interacts with permanent magnets in the rotor to create torque. As the rotor position changes, the path of the magnetic field changes slightly, resulting in slight variations in the amount of torque, called torque ripple.

SUMMARY OF THE DISCLOSURE

An electric motor stator includes a magnetically conductive ring, a plurality of metal bobbins, and a plurality of magnetically conductive inserts. The magnetically conductive ring has a plurality of inward-facing magnetically conductive teeth. Each of the bobbins define cavities on each side of a respective tooth. Each bobbin is wound with electrically conductive wire. The magnetically conductive inserts are installed within the cavities thereby effectively widening the tooth tips to reduce torque ripple of the electric motor. In some embodiments, the magnetically conductive inserts have a triangular cross section. In other embodiments, multiple inserts of varying cross sectional area, are present on each side of each tooth.

A hybrid automotive transmission includes a rotor, a magnetically conductive stator ring, a plurality of resin bobbins, and a plurality of magnetically conductive inserts. The magnetically conductive stator ring has a plurality of magnetically conductive teeth directed toward the rotor. Each bobbin defines cavities on each side of a respective tooth. Each bobbin is wound with electrically conductive wire. The magnetically conductive inserts are installed within the cavities to effectively widen tips of the teeth to reduce torque ripple. The hybrid automotive transmission may also include an inverter connected to the electrically conductive wire by three cables and a battery connected to the inverter by a Direct Current bus.

A method of assembling a stator includes inserting magnetically conductive inserts into cavities of resin bobbins, winding electrically conductive wire around each of the bobbins, and installing the bobbins over each tooth of a magnetically conductive stator ring. In some embodiments, the magnetically conductive inserts have a triangular cross section. In other embodiments, multiple inserts of varying cross sectional area, are present on each side of each tooth.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
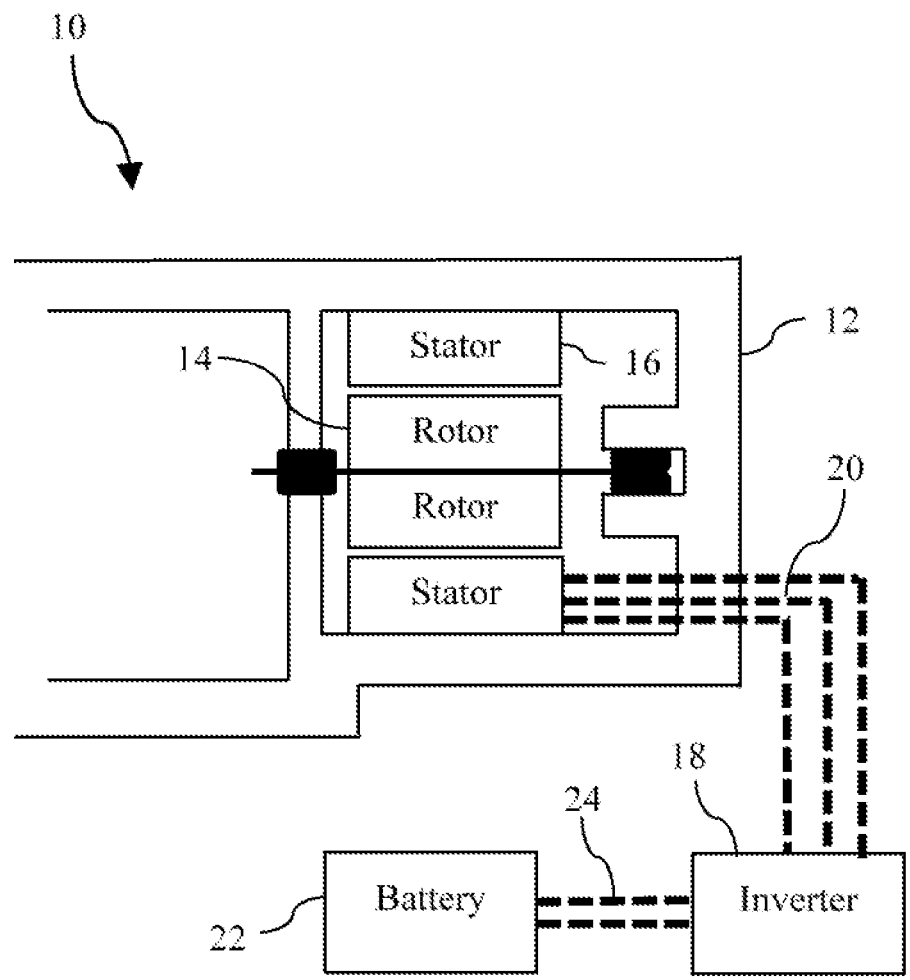
FIG. 1 is a schematic cross section of an electrified automotive transmission.

FIG. 1 illustrates a portion of an electrified automotive transmission. The transmission includes transmission case 12 which is fixed to vehicle structure. An electric motor rotor 14 is supported for rotation with respect to the transmission case 12 via bearings. A stator 16 is fixed to transmission case 12 such that the rotor and stator are separated by a narrow air gap. As will be discussed in more detail below, stator 16 includes three groups of stator windings. These windings are connected to inverter 18 by three power cables 20. Inverter 18 draws power from battery 22 via Direct Current (DC) bus 24. In response to signals from a controller, inverter 18 produces an Alternating Current (AC) voltage on each of the three cables 20. These AC voltages induce current in the stator windings. The current in the stator windings induce a magnetic field in the stator and the rotor that interact with permanent magnets in the rotor to produce a torque on the rotor. The transmission also includes gearing which transmits the rotor torque to vehicle wheels. The gearing may combine the rotor torque with other torque sources such as an internal combustion engine and/or other motors.

Figure 2:
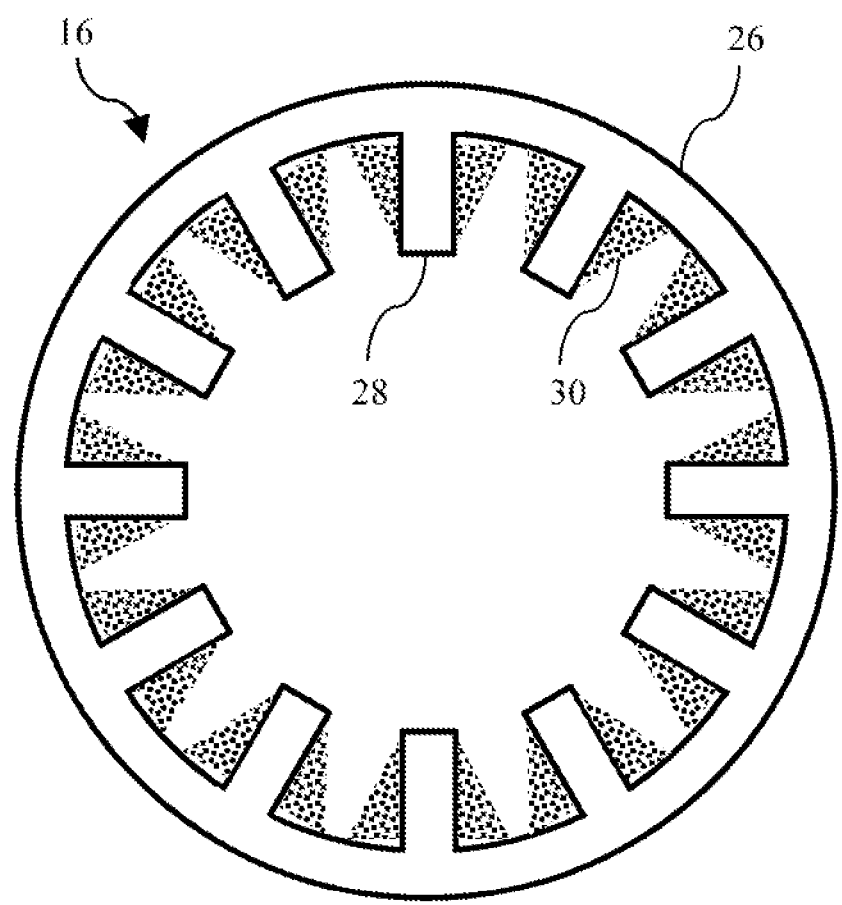
FIG. 2 is a cross section of a stator.

FIG. 2 is a cross section of stator 16. A stator ring 26 is made from magnetically conductive materials. Ring 26 includes a number of teeth 28 projecting inwardly toward the rotor. In the stator of FIG. 2, 12 teeth are present. The number of teeth is a multiple of three. Wire is wound around each tooth to create windings 30. In a mass-production setting, it is impractical to wind the wire directly around the teeth while the teeth with the teeth attached to the complete ring. Two methods are known for assembling a stator as illustrated in FIGS. 3 and 4 and described below.

Figure 3:
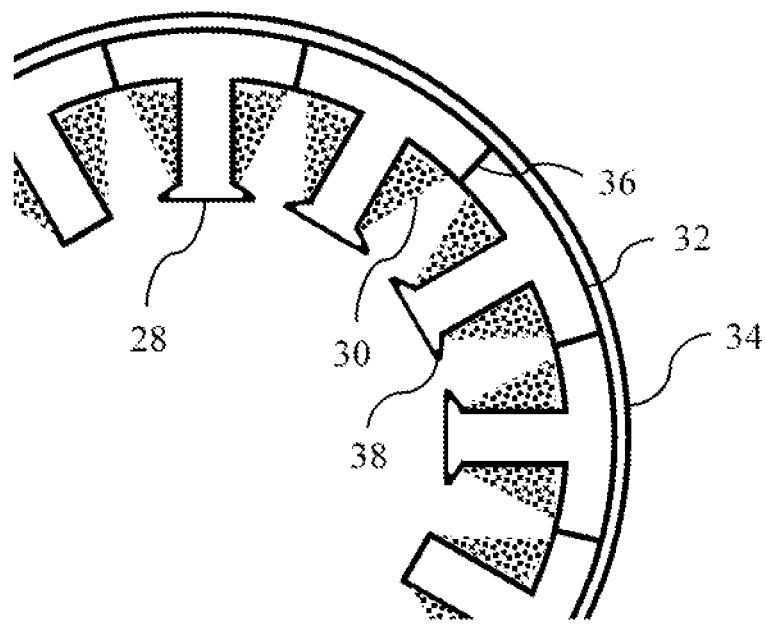
FIG. 3 is a cross section of a segmented stator.

FIG. 3 illustrates a segmented stator assembly. In this type of stator assembly, the stator ring is assembled from a number of separate segments 32. The number of segments is equal to the number of teeth such that each segment includes one tooth 28. While the segments are separate, wire can be efficiently wound around each tooth to create the windings 30. After all segments are wound, they are assembled together and held together by a band 34. One disadvantage of a segmented stator is that the joints 36 between adjacent segments reduce the magnetic conductivity of the assembled ring. That reduced the efficiency of the motor. An advantage of a segmented stators is that relatively complex tooth shapes are feasible. Extending the tips of the teeth outward as shown at 38 improves the magnetic field near the air gap. Specifically, the magnetic field changes more gradually as the rotor moves past the teeth, resulting in reduced torque ripple.

Figure 4:
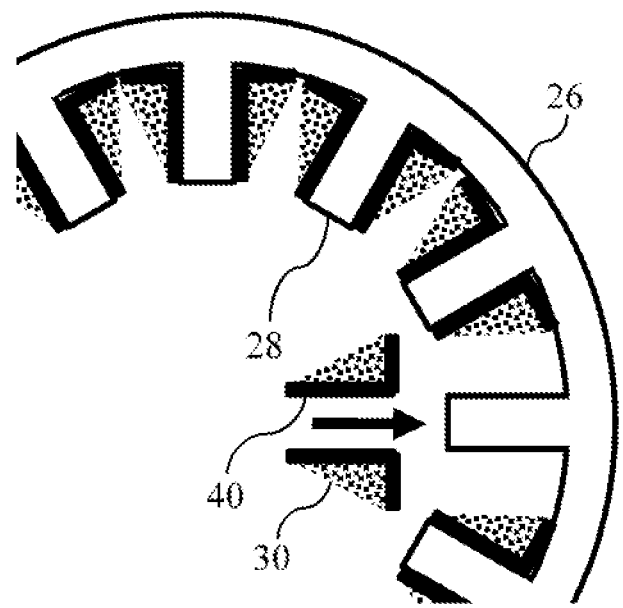
FIG. 4 is a cross section of a complete stator.

FIG. 4 illustrates a complete (non-segmented) stator assembly. In this type of stator assembly, the stator ring and teeth are fabricated without joints which would interfere with the magnetic circuit. For example, the stator ring may be formed by fabricated a number of stamped plates with the cross section shown in FIG. 4 and attaching them together in layers to form the stator ring 26 with teeth 28. Resin (non-magnetic) bobbins 40 are wound with wire and then inserted over the teeth. The shape of the teeth is constrained by the need to be able to slide the bobbin over the teeth. In particular, tooth tips as shown at 38 in FIG. 3 is not feasible. As such, complete stators tend to exhibit more torque ripple than segmented stators.

Figure 5:
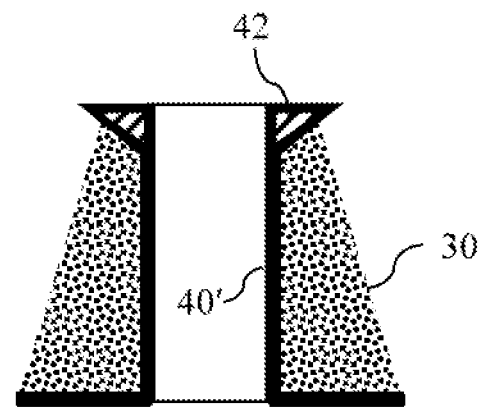
FIG. 5 is a cross section of a resin bobbin with an embedded magnetically conductive insert.
Figure 6:
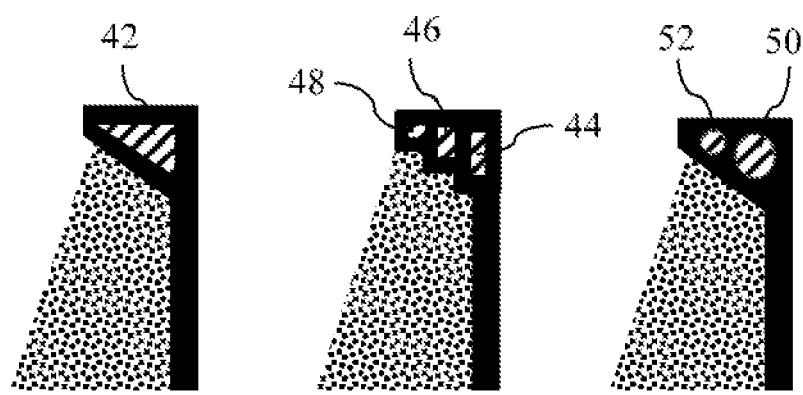
FIG. 6 is an illustration of various alternative magnetically conductive insert configurations.

FIG. 5 illustrates a type of bobbin that dramatically reduces the torque ripple associated with complete stators without introducing the joints associated with segmented stators. Resin bobbin 40' defines cavities on each side of the tooth that are filled with magnetically conductive inserts 42. The inventors have discovered that these magnetically conductive inserts spread the magnetic field nearly as effectively as the tips of segmented stator teeth. The inventors have discovered that the resin surrounding the magnetically conductive inserts does not interfere with the torque ripple reducing effect. FIG. 6 shows several embodiments in which the number and shape of the magnetically conductive inserts varies. In the primary embodiment, illustrated at left, a single wedge-shaped (triangular cross section) insert is used one each side of each tooth. In the first alternative embodiment, illustrated in the middle of FIG. 6, three rectangular inserts are placed on each side of each tooth with the inserts closer to the tooth being somewhat longer than those farther away from the tooth. In the second alternative embodiment, illustrated at the right in FIG. 6, two round inserts are placed on each side of each tooth with the insert closer to the tooth being larger in diameter.

Figure 7:
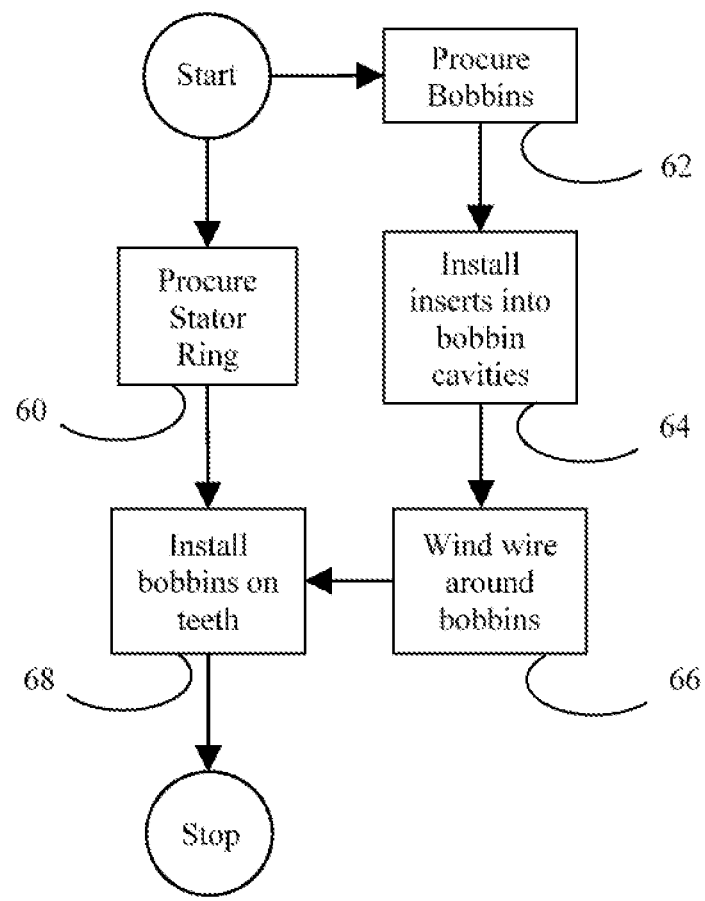
FIG. 7 is a flow chart for a method of assembling a stator.

FIG. 7 is a flow chart for a method of assembling a stator. At 60 and 62, the stator ring and the bobbins, respectively, are procured. At 64, magnetically conductive inserts are installed into the bobbins. At 66, each bobbin is wound with wire. Finally, at 68, the bobbins are installed over the teeth of the stator ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electric motor stator comprising:
   a magnetically conductive ring having a plurality of inward-facing magnetically conductive teeth;
   a plurality of resin bobbins, each of the plurality of resin bobbins having a widened tip section at a top of the teeth when compared to a width at a bottom of the teeth, each bobbin defining cavities on each side of a respective tooth at the widened tip and wound with electrically conductive wire; and
   a plurality of magnetically conductive inserts within the cavities at the widening tips associated with the teeth to reduce torque ripple of the electric motor.

2. The electric motor stator of claim 1 wherein the magnetically conductive inserts have a triangular cross section, and the cavities are formed by a sloped cross section of the widened tip.

3. The electric motor stator of claim 1 wherein more than one magnetically conductive insert is present on each side of each tooth, and wherein the inserts farthest from the teeth have less cross sectional area than the inserts closer to the teeth, and the cavities are formed by a sloped cross-section of the widened tip.

4. The electric motor stator of claim 3 wherein each of the inserts have a rectangular cross section.

5. The electric motor stator of claim 3 wherein each of the inserts have a round cross section.

6. The electric motor stator of claim 1, wherein more than one magnetically conductive insert is present on each side of each tooth, and wherein the inserts farthest from the teeth have less cross sectional area than the inserts closer to the teeth, and the cavities are formed by a stepped cross-section of the widened tip.

7. A hybrid automotive transmission comprising:
   a rotor supported for rotation; and
   a magnetically conductive stator ring having a plurality of magnetically conductive teeth directed toward the rotor;

a plurality of resin bobbins, each bobbin having a widened tip section at a top of the teeth when compared to a width at a bottom of the teeth and defining cavities on each side of a respective tooth at the widened tip, and wound with electrically conductive wire; and a plurality of magnetically conductive inserts within the cavities at the widening tips associated with the teeth to reduce torque ripple.

8. The hybrid automotive transmission of claim 7 wherein the magnetically conductive inserts have a triangular cross section, and the cavities are formed by a sloped cross section of the widened tip.

9. The hybrid automotive transmission of claim 7 wherein more than one magnetically conductive insert is present on each side of each tooth, and wherein the inserts farthest from the teeth have less cross sectional area than the inserts closer to the teeth, and the cavities are formed by a sloped cross section of the widened tip.

10. The hybrid automotive transmission of claim 9 wherein each of the inserts have a rectangular cross section.

11. The hybrid automotive transmission of claim 9 wherein each of the inserts have a round cross section.

12. The hybrid automotive transmission of claim 9, wherein more than one magnetically conductive insert is present on each side of each tooth, and wherein the inserts farthest from the teeth have less cross sectional area than the inserts closer to the teeth, and the cavities are formed by a stepped cross-section of the widened tip.

13. The hybrid automotive transmission of claim 7 further comprising an inverter connected to the electrically conductive wire by three cables.

14. The hybrid automotive transmission of claim 13 further comprising a battery connected to the inverter by a Direct Current bus.

15. A method of assembling a stator comprising:

procuring a plurality of resin bobbins, each bobbin defining at least two cavities at a widened tip corresponding to a top of a stator tooth;

inserting magnetically conductive inserts into the cavities;

winding electrically conductive wire around each of the bobbins;

procuring a magnetically conductive stator ring having a plurality of projecting teeth; and installing one of the bobbins over each of the projecting teeth.

16. The method of claim 15 wherein the magnetically conductive inserts have a triangular cross section, and the widened tip has a sloped cross section.

17. The method of claim 15 wherein the bobbins each define at least four cavities and the inserts inserted into the cavities farthest from the teeth have cross sectional areas less than the inserts inserted in the cavities closer to the teeth, and the cavities are formed by a sloped cross section of the widened tip.

18. The method of claim 17 wherein each of the inserts have a rectangular cross section.

19. The method of claim 17 wherein each of the inserts have a round cross section.

20. The method of claim 15, further comprising providing more than one magnetically conductive insert on each side of each tooth, wherein the inserts farthest from the teeth have less cross sectional area than the inserts closer to the teeth, and the cavities are formed by a stepped cross-section of the widened tip.

* * * * *